(12) United States Patent
Saini et al.

(10) Patent No.: US 10,781,790 B2
(45) Date of Patent: *Sep. 22, 2020

(54) BULKHEAD ARRANGEMENT FOR A WIND TURBINE BLADE

(71) Applicant: LM WP PATENT HOLDING A/S, Kolding (DK)

(72) Inventors: Aanchal Saini, Bangalore (IN); Utsa Majumder, Bangalore (IN); Christian Munk Christensen, Fredericia (DK); Christian Roed Lysemose, Haderslev (DK); Peter Hansen, Kolding (DK); Finn Kjaer Nielsen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 74 days.

This patent is subject to a terminal disclaimer.

(21) Appl. No.: 16/127,632

(22) Filed: Sep. 11, 2018

(65) Prior Publication Data

US 2019/0017493 A1 Jan. 17, 2019

Related U.S. Application Data

(63) Continuation of application No. 14/442,018, filed as application No. PCT/EP2013/074128 on Nov. 19, 2013, now Pat. No. 10,100,806.

(30) Foreign Application Priority Data

Nov. 19, 2012 (EP) .................................... 12193160

(51) Int. Cl.
*F03D 1/06* (2006.01)

(52) U.S. Cl.
CPC ............ *F03D 1/0675* (2013.01); *Y02E 10/72* (2013.01); *Y10T 29/49336* (2015.01); *Y10T 29/49337* (2015.01)

(58) Field of Classification Search
CPC ...... F03D 1/0633; F03D 1/065; F03D 1/0658; F03D 1/0675; F03D 1/0691; F03D 80/00; F03D 80/50; F03D 80/55; Y02E 10/721
See application file for complete search history.

(56) References Cited

U.S. PATENT DOCUMENTS

2008/0034675 A1 2/2008 Kristensen
2008/0118365 A1 5/2008 Bendel et al.
(Continued)

FOREIGN PATENT DOCUMENTS

DE 102010042530 A1 3/2012
GB 2254382 A 10/1992
(Continued)

OTHER PUBLICATIONS

Search Report issued in International Application No. PCT/EP2013/074128 dated Dec. 5, 2013.

*Primary Examiner* — David E Sosnowski
*Assistant Examiner* — Danielle M. Christensen
(74) *Attorney, Agent, or Firm* — Nath, Goldberg & Meyer; Jerald L. Meyer; Tanya E. Harkins

(57) ABSTRACT

A bulkhead assembly for a wind turbine blade is described, wherein a pressure relief conduit is provided at the bulkhead to allow for pressure to equalise across the bulkhead. This helps to prevent faults or cracks in the bulkhead assembly due to differences in pressure on either side of the bulkhead. Furthermore, liquid traps and/or filter media can be accommodated in the conduit to prevent the passage of liquids or other matter across the bulkhead.

27 Claims, 8 Drawing Sheets

(56) References Cited

U.S. PATENT DOCUMENTS

2009/0136355 A1 5/2009 Finnigan et al.
2012/0141287 A1 6/2012 Hynum et al.

FOREIGN PATENT DOCUMENTS

WO 2011144971 A1 11/2011
WO 2012119934 A1 9/2012

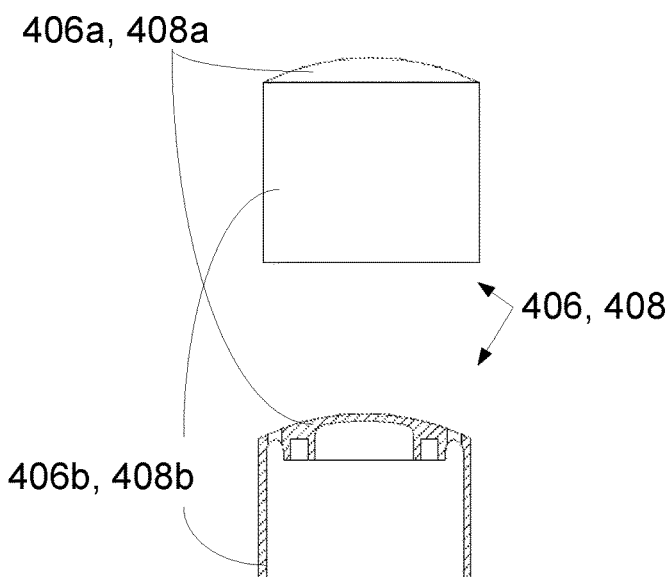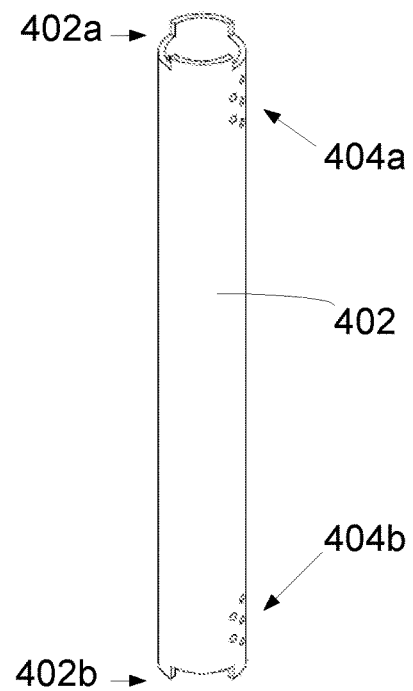
Fig. 8(a)　　　　　Fig. 8(b)
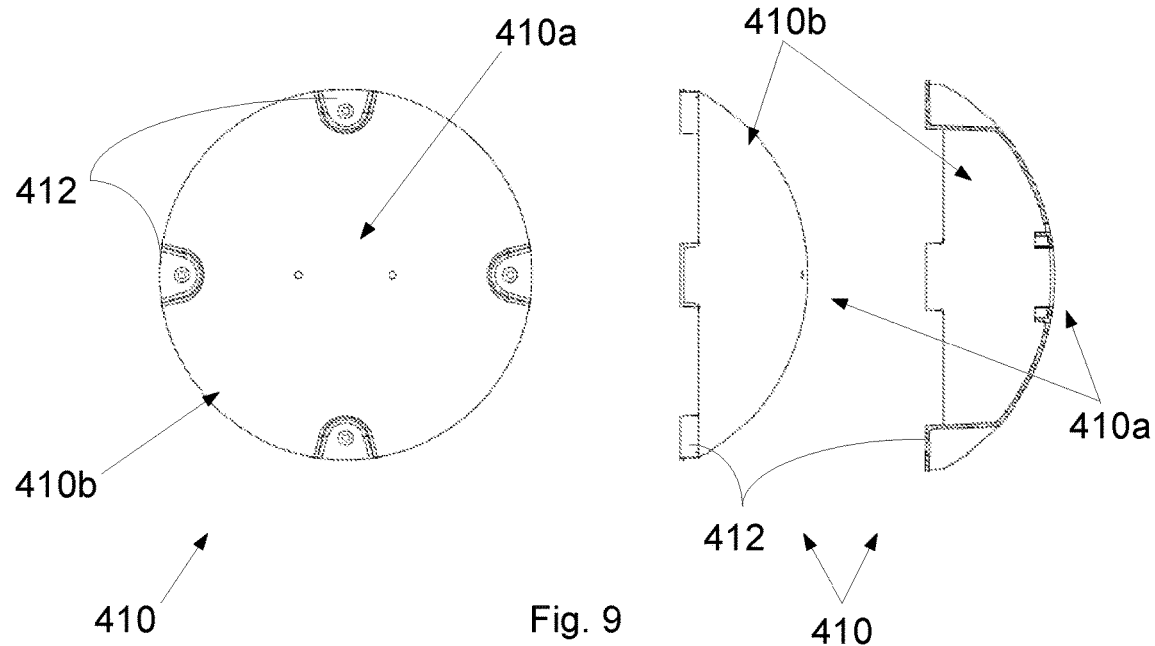
Fig. 9

BULKHEAD ARRANGEMENT FOR A WIND TURBINE BLADE

This is a Continuation Application of U.S. patent application Ser. No. 14/442,018, filed May 11, 2015, an application filed as a national stage under 371 of Application No. PCT/EP2013/074128 filed Nov. 19, 2013 an application claiming the benefit from European Application No. 12193160.4, filed Nov. 19, 2012, the contents of each of which are hereby incorporated by reference in their entirety.

FIELD OF THE INVENTION

The present invention relates to a bulkhead arrangement for a wind turbine blade.

BACKGROUND OF THE INVENTION

Wind turbine blades are often provided with a bulkhead arranged at the root end of the blade. The bulkhead is generally used to provide a work platform for workers carrying out maintenance or repair on the blade, and to prevent internal debris and fluids such as water or oil from passing between the internal blade cavity and the wind turbine rotor hub and machine housing.

The bulkhead may be flexibly mounted to the internal wall of the wind turbine blade using a flexible mounting flange, an example of which can be seen in WO 2012/119934. Alternatively, the bulkhead may be rigidly mounted to the internal wall. A sealing member may be located around the periphery of the bulkhead, to ensure that the bulkhead is watertight.

One issue with such current wind turbine blade bulkhead arrangements is that cracks or faults may be observed in the mounting flanges and/or sealing members over time, thereby compromising the integrity of the bulkhead mounting and the effectiveness of the sealing properties of the bulkhead. It is thought that such faults are the result of centrifugal forces acting on the flanges and/or sealing members, blade deformations due to wind loads, and pressure differentials between opposed sides of the bulkhead.

Such cracks or faults must be repaired to ensure operational effectiveness of the wind turbine. The current approach to mitigating such problems is the construction of stronger mounting flanges and/or sealing members, resulting in an increase in blade costs and/or weight.

Accordingly, it is an object of the invention to provide a bulkhead system for a wind turbine blade having improved resistance to operational defects such as crack or fault formation in the bulkhead mounting flanges and/or sealing members.

SUMMARY OF THE INVENTION

Accordingly, there is provided a wind turbine blade comprising:
 a sealed bulkhead provided in said wind turbine blade; and
 at least one pressure relief conduit having a first open end located at a first side of said bulkhead and a second open end located at a second side of said bulkhead,
 wherein said pressure relief conduit is operable to equalize the pressure difference between said first side and said second side of said bulkhead.

By providing a pressure relief conduit in fluid communication between either side of a blade bulkhead, the strain on the bulkhead, and in particular on the joint between the bulkhead and the body of the wind turbine blade, can be reduced by avoiding a pressure difference across the bulkhead.

It will be understood that the wind turbine blade comprises a blade body having an outer blade shell defining an internal blade cavity. It will be understood that the bulkhead may be provided within said blade cavity to divide an internal cavity of the wind turbine blade into separate portions. Furthermore, it will be understood that the bulkhead may preferably be provided at or on the root end of the wind turbine blade.

It will also be understood that the bulkhead may comprise at least one sealable access opening. Such a sealable access opening can be understood as an access hatch or door providing passage through said bulkhead, which is closed an sealed during normal use of the wind turbine blade, the access opening having a diameter suitable for the passage of a worker. The at least one sealable access opening is understood to be distinct from said at least one pressure relief conduit, where preferably the diameter of said pressure relief conduit is less than 10 centimetres.

In one aspect of the invention, the at least one pressure relief conduit may comprise a bore defined in the body of said bulkhead, said bore extending from the first side of said bulkhead to the second side of said bulkhead.

Additionally or alternatively, the at least one pressure relief conduit comprises a tube or pipe extending through the body of said bulkhead.

Additionally or alternatively, at least one pressure relief conduit is arranged adjacent said bulkhead.

In one aspect, said at least one pressure relief conduit is provided between said bulkhead and the blade body or outer blade shell of said wind turbine blade.

In an additional or alternative aspect of the invention, said bulkhead is secured to the blade body via a sealing flange provided about the periphery of said bulkhead, said sealing flange located between said bulkhead and said blade body, wherein said at least one pressure relief conduit extends through said sealing flange, adjacent to said bulkhead.

It will be understood that the sealing flange may comprise at least one flexible member arranged around the periphery of the bulkhead.

In an alternative aspect, said at least one pressure relief conduit is provided in the blade body or outer blade shell of said wind turbine blade.

In such an embodiment, said at least one pressure relief conduit is provided as a tube or conduit embedded into the wall of the blade body, having first and second open ends located at opposed sides of said bulkhead. Such a tube or conduit may be arranged in the wall of the blade body during manufacture of the blade shell, e.g. during fibre lay-up of a shell for a wind turbine blade.

Preferably, said at least one pressure relief conduit comprises at least one liquid trap.

It will be understood that said at least one liquid trap may comprise a U-bend, a J-bend, or an S-bend trap in said conduit.

In one aspect of the invention said at least one conduit is provided in a curved arrangement, wherein at least one of said first or second ends extends back in the direction of the opposed second or first end of the conduit.

Such an arrangement acts to provide a simple liquid trap for the conduit, preventing the ease that moisture may enter the conduit.

Additionally or alternatively, said at least one liquid trap may comprise a filter material located within said conduit.

Said filter material may comprise a permeable sponge, a permeable membrane, or any suitable material arranged to allow the passage of gases and vapours through said conduit and to prevent the passage of fluids such as water, oil, etc., and/or debris such a dirt, dust, waste material, etc. through the conduit.

It will be understood that the at least one pressure relief conduit may be formed from a flexible tube. Additionally or alternatively, the at least one conduit may be formed from pre-formed or moulded piping. The conduit may be formed from a C-shaped, S-shaped, U-shaped, or J-shaped piece of tubing or piping.

In a preferred aspect of the invention, there is provided a wind turbine blade having a blade body defining an internal cavity, the wind turbine blade comprising:
 a bulkhead provided in said internal cavity; and
 a bulkhead valve located at said bulkhead, the bulkhead valve extending from a first end located at a first side of said bulkhead and a second end located at a second side of said bulkhead,
 wherein said bulkhead valve comprises a pressure relief conduit extending between said first end and said second end, said pressure relief conduit formed to have at least one liquid trap between said first end and said second end.

The valve acts to relieve pressure on either side of bulkhead, while the liquid trap prevents the passage or moisture and/or dirt or debris across the bulkhead. Preferably, the wind turbine blade comprises a blade root wherein said bulkhead is located at or on the blade root.

In a further aspect of the invention, said at least one pressure relief conduit is formed from a first pressure release tube having a first open end and a second closed end, and a second pressure release tube having a first open end and a second end,
 wherein the first open end of said pressure relief conduit is formed by the first open end of said first pressure release tube,
 wherein the second open end of said pressure relief conduit is formed by the first open end of said second pressure release tube, and
 wherein said first and second pressure relief tubes are communicatively coupled via an outlet channel extending between said first and second pressure relief tubes,
 wherein said outlet channel is arranged on said first pressure relief tube at a point between the first and second ends of said first pressure relief tube.

By spacing the outlet channel from the second closed end of the first pressure relief tube, a simple liquid trap is created between the first and second pressure relief tubes.

Preferably, said second pressure release tube comprises a second closed end opposed to said first open end, wherein said outlet channel is arranged on said second pressure relief tube at a point between the first and second ends of said second pressure relief tube.

Preferably, at least one of said first and second pressure relief tubes comprises a curved section to form at least one liquid trap between the respective first and second ends.

Preferably, at least one of said first and second pressure relief tubes comprises a J-shaped tube.

There is further provided a bulkhead for a wind turbine blade, the bulkhead having at least one pressure relief conduit having a first end located at a first side of said bulkhead and a second end located at a second side of said bulkhead,
 wherein said pressure relief conduit is operable to equalize the pressure difference between said first side and said second side of said bulkhead when the bulkhead is installed in or on a wind turbine blade.

In one aspect, said at least one pressure relief conduit extends through the body of said bulkhead. In an additional or alternative aspect, said at least one pressure relief conduit is provided adjacent the body of said bulkhead, preferably extending through a sealing flange provided about the periphery of said bulkhead.

In a further aspect of the invention, the wind turbine blade comprises a pressure relief conduit assembly, wherein the blade comprises at least one end cap provided at one of said first or second open ends of said at least one pressure relief conduit, said at least one end cap arranged to substantially seal said conduit at said first or second open end.

Preferably, at least one ventilation hole is defined in a wall of said pressure relief conduit, further preferably wherein said at least one ventilation hole is provided adjacent said at least one end cap.

Preferably, said at least one cap comprises an end piece to substantially seal an open end of said conduit, said at least one end cap further comprising a collar depending from said end piece, said collar spaced from the wall of said pressure relief conduit, and acting to shield at least a portion of said at least one ventilation hole.

Preferably, said collar extends from a location adjacent an end of said pressure relief conduit to a location along the longitudinal length of said pressure relief conduit beyond the location of said at least one ventilation hole on said pressure relief conduit.

Preferably, said collar extends in a direction substantially parallel to the wall of said pressure relief conduit.

Preferably, said collar extends in a direction flared away from the wall of said pressure relief conduit.

Preferably, said at least one end cap is arranged to be attached to said bulkhead or to an internal wall of said wind turbine blade.

Preferably, said at least one end cap comprises at least one bolt lug.

Preferably, said at least one end cap is arranged such that a gap is defined between an end of said collar and the attached bulkhead or internal wall of the wind turbine blade.

Preferably, a first set of ventilation holes are defined in a wall of said pressure relief conduit at a location adjacent said first open end, and wherein a second set of ventilation holes are defined in a wall of said pressure relief conduit at a location adjacent said second open end.

Preferably, the wind turbine blade comprises a first end cap provided at said first open end of said pressure relief conduit and a second end cap provided at said second open end of said pressure relief conduit, wherein said first end cap acts to shield at least a portion of said first set of ventilation holes and wherein said second end cap acts to shield at least a portion of said second set of ventilation holes.

There is also provided a method of manufacturing a wind turbine blade, the method comprising the steps of:
 providing a wind turbine blade shell;
 providing a bulkhead located on or in said wind turbine blade; and
 providing at least one pressure relief conduit having conduit openings either side of said bulkhead, said pressure relief conduit arranged to equalise the pressure difference across said bulkhead.

In one aspect, said step of providing at least one pressure relief conduit comprises providing a conduit which extends through said bulkhead.

In an additional or alternative aspect, said step of providing at least one pressure relief conduit comprises providing a conduit which is located adjacent said bulkhead, preferably extending through a sealant member or sealing flange provided around the periphery of said bulkhead between said bulkhead and said wind turbine blade shell.

In a further additional or alternative aspect, the method comprises the step of:

embedding at least a portion of said pressure relief conduit in a wall of said wind turbine blade shell, prior to a step of installing said bulkhead in said wind turbine blade shell.

In one aspect, the step of providing a wind turbine blade shell comprises the steps of laying up a fibre-based composite in a mould and curing said fibre-based composite to form at least a portion of a wind turbine blade shell, wherein said step of embedding comprises incorporating at least a portion of said conduit in said blade wall during said laying up process, e.g. moulding the conduit into the blade wall during a fibre lay-up process in a blade mould.

Preferably, the method comprises the steps of:

securing said pressure relief conduit to an internal surface of said wind turbine blade shell, preferably adhering said pressure relief conduit to said internal surface;

sealing said bulkhead in said wind turbine blade shell using a sealing flange about the periphery of said bulkhead, wherein said pressure relief conduit extends either side of said sealing flange.

It will be understood that any of the above described features may be combined and implemented in a single embodiment without departing from the scope of the invention.

DESCRIPTION OF THE INVENTION

Embodiments of the invention will now be described, by way of example only, with reference to the accompanying drawings, in which:

FIG. 8(a) shows a side plan view and a cross-sectional view of an end cap of the assembly of FIG. 7;

FIG. 8(b) shows an isometric perspective view of a tube of the assembly of FIG. 7;

FIG. 9 shows a top plan view, a side plan view, and a cross-sectional view of an end cap of a pressure relief conduit assembly according to a further embodiment of the invention.

Figure 1:
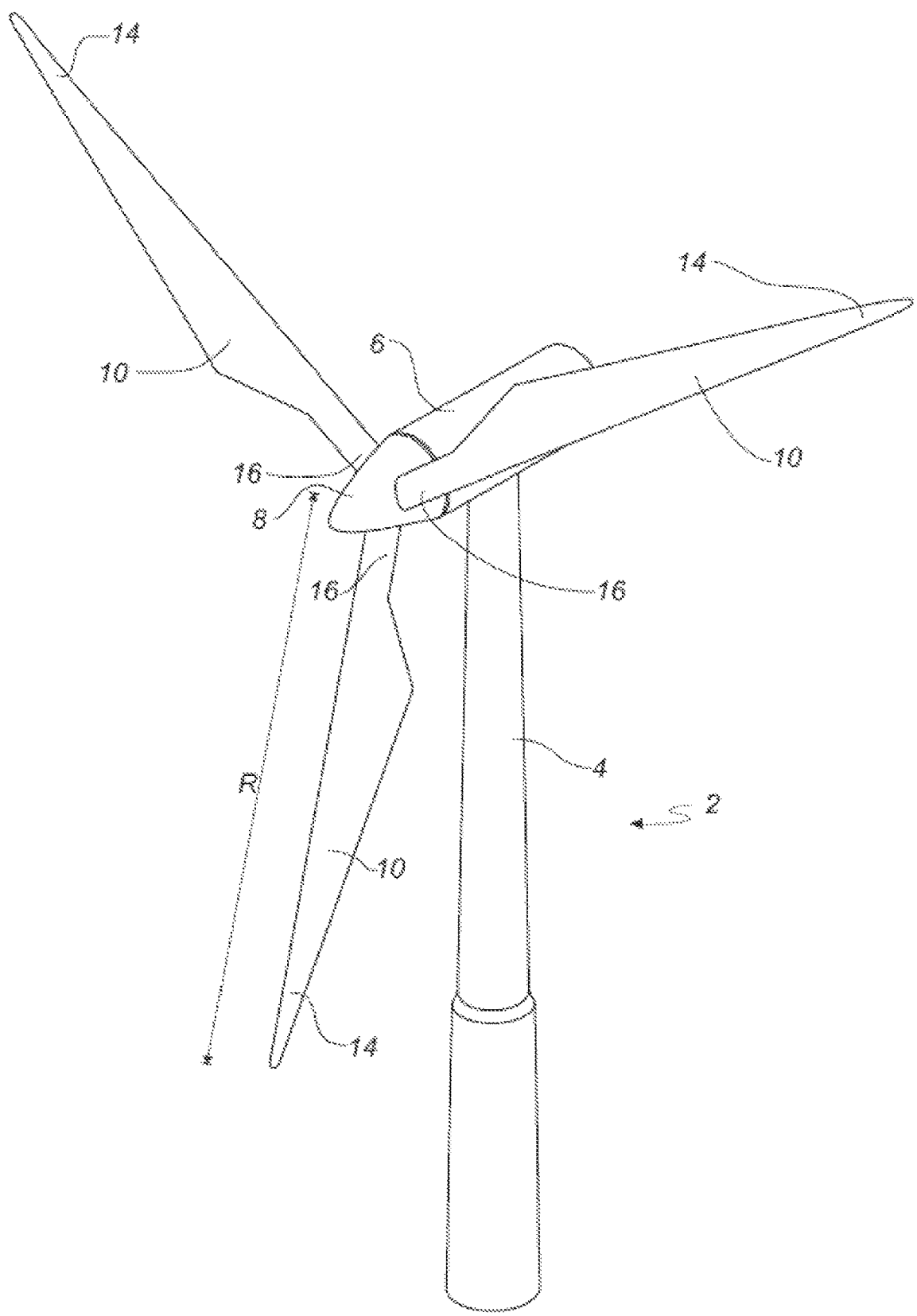
FIG. 1 shows a side plan view of a wind turbine according to an embodiment of the invention comprising a de-icing array.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
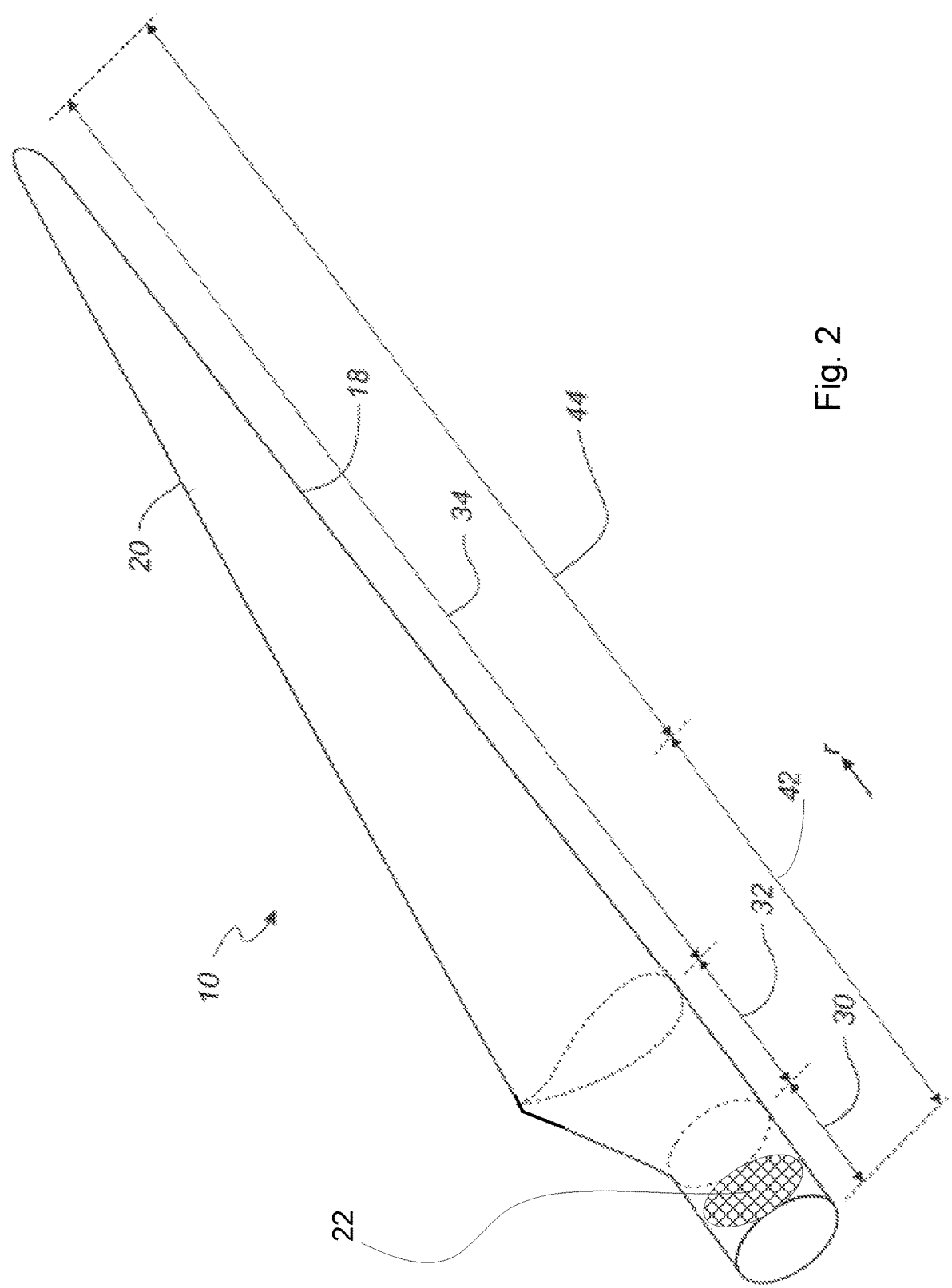
FIG. 2 shows the wind turbine of FIG. 1 when a wind turbine blade is pitched relative to the de-icing array.

FIG. 2 shows a schematic view of a first embodiment of a wind turbine blade 10 which may be used according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

Figure 3:
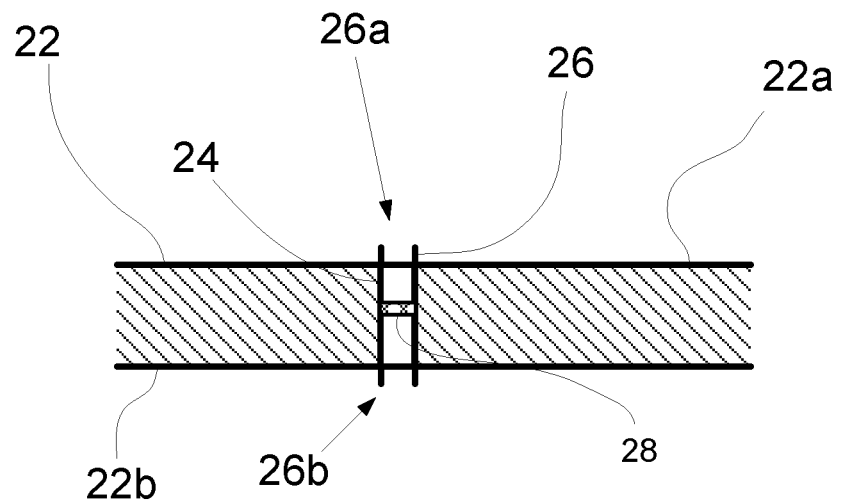
FIG. 3 shows a cross-sectional view of a first embodiment of a bulkhead assembly according to the invention.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape of the root region 30 to the airfoil profile 50, as shown in FIG. 3, of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Wind turbine blades are generally formed from fibre-reinforced plastics material, e.g. glass fibres and/or carbon fibres which are arranged in a mould and cured with a resin to form a solid structure, in this case a shell to form a wind turbine blade 10. Modern wind turbine blades can often be in excess of 30-40 metres in length, having blade root diameters of several metres.

The wind turbine further comprises a bulkhead 22 provided inside the shell of the wind turbine blade 10, which acts to seal the interior of the wind turbine blade 10. The bulkhead may be provided towards the root end 16 of the wind turbine blade 10, preferably within the inboard 20% of the blade 10. It will be understood that the bulkhead 22 may be provided at the substantially circular opening defined at the root end 16, or may be spaced from the terminal point of the blade 10. The bulkhead 22 may be rigidly secured to the internal wall of the wind turbine blade shell 10, for example bolted or riveted, or the bulkhead 22 may be connected to the wind turbine blade shell 10 via a relatively flexible connection, e.g. a flexible flange member arranged around the periphery of the bulkhead, which is coupled to the internal wall of the shell of the wind turbine blade 10. The bulkhead 22 may comprise a number of access hatches or doors (not shown) to permit passage through the bulkhead 22. The bulkhead 22 is arranged to be substantially watertight during operation of the wind turbine, to prevent liquids or debris passing between the interior of the blade 10 and the general machine housing of the rotor hub 8 and the nacelle 6.

The wind turbine further comprises a pressure relief conduit, which is located at, on, or in said bulkhead 22, and which acts to relieve the pressure difference which may be experienced across the bulkhead 22. By providing such a conduit, the pressure difference across the bulkhead 22, between a first side facing the interior of the wind turbine blade 10 and a second side facing outwards from the root end 16 of the blade 10, can be allowed to equalise. Accordingly, any damage or cracking to the bulkhead 22 itself and/or to any mounting or sealing means used in the wind turbine due to the existence of a pressure difference across the bulkhead 22 can be prevented.

With reference to FIG. 3, a cross-sectional view of a section of a bulkhead assembly according to an embodiment of the invention is shown. The bulkhead 22 comprises a first side 22a and a second side 22b. A through-going bore 24 is provided in the bulkhead 22 extending through the body of the bulkhead 22, between the first and second sides 22a,22b. A pressure relief conduit 26 is provided at said bore 24, the conduit having a first open end 26a located at the first side 22a of said bulkhead 22, and a second open end 26b located at the second side 22b of said bulkhead 22. The conduit 26 provides for gaseous communication between the first and second sides 22a,22b of the bulkhead 22, such that the pressure across the bulkhead 22 may be equalised.

In the embodiment of FIG. 3, the open ends 26a,26b of the conduit 26 stand proud of the surface of the body of the bulkhead 22, but is will be understood that the ends 26a,26b of the conduit 26 may alternatively be provided flush with the surface of the bulkhead 22.

The pressure relief conduit 26 may further comprise a filter medium. The embodiment of FIG. 3 comprises a mesh or sponge 28 located in the conduit 26, which is arranged to prevent the passage of debris through the conduit 26.

In a further aspect of the invention, the pressure relief conduit may comprise at least one liquid trap located between the first and second open ends of the conduit.

Figure 4:
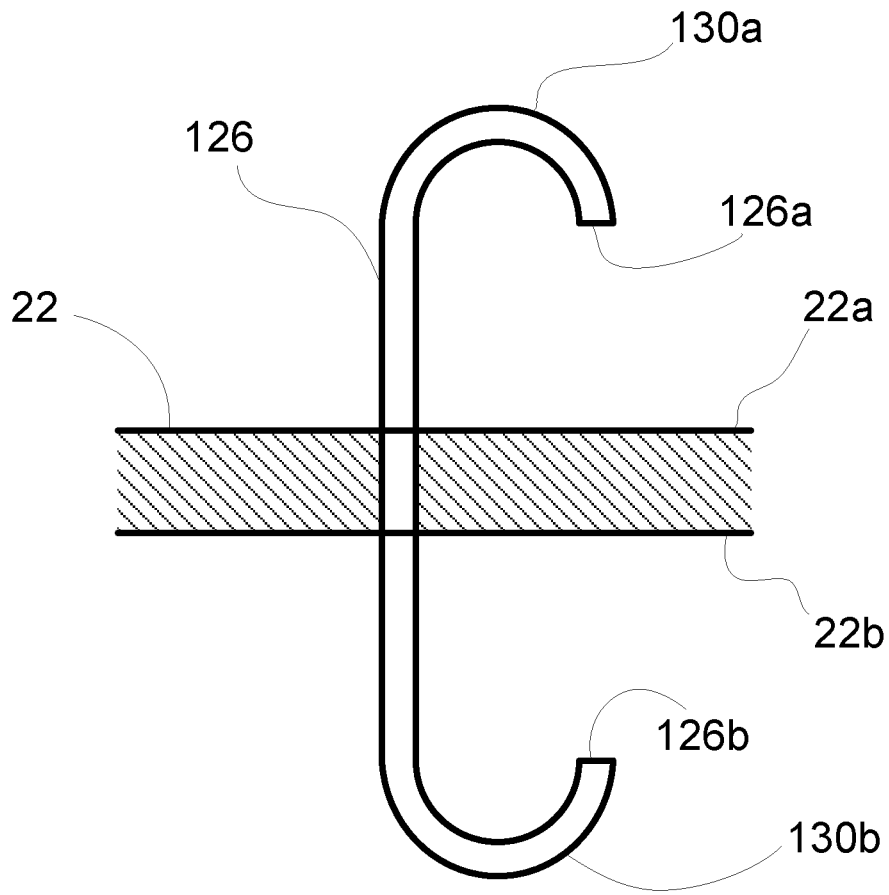
FIG. 4 shows a cross-sectional view of a second embodiment of a bulkhead assembly according to the invention.

A further embodiment of a bulkhead assembly according to the invention is shown in FIG. 4. In this embodiment, the pressure relief conduit is a shaped piece of tubing 126 which extends through bore 24 of the bulkhead 22, wherein the conduit 126 comprises a first liquid trap in the form of a U-bend 130a in the tubing, the first liquid trap located towards the first open end 126a of the conduit 126, the conduit 126 further comprising a second liquid trap in the form of a U-bend 130b in the tubing, the second liquid trap located towards the second open end 126b of the conduit 126.

The presence of the liquid traps 130a,130b towards the ends 126a,126b of the conduit 126 acts to restrict the entrance of liquids into the conduit 126, where liquids may pass from the interior of the wind turbine blade 10 to the machine housing of the wind turbine.

It will be understood that the at least one pressure relief conduit may be formed from a flexible tube, or a section of pre-formed or moulded piping. It will be understood that the liquid trap may be formed by any suitable shaping of the tubing forming the conduit, e.g. a C-shaped, S-shaped, U-shaped, or J-shaped piece of tubing or piping.

Figure 5:
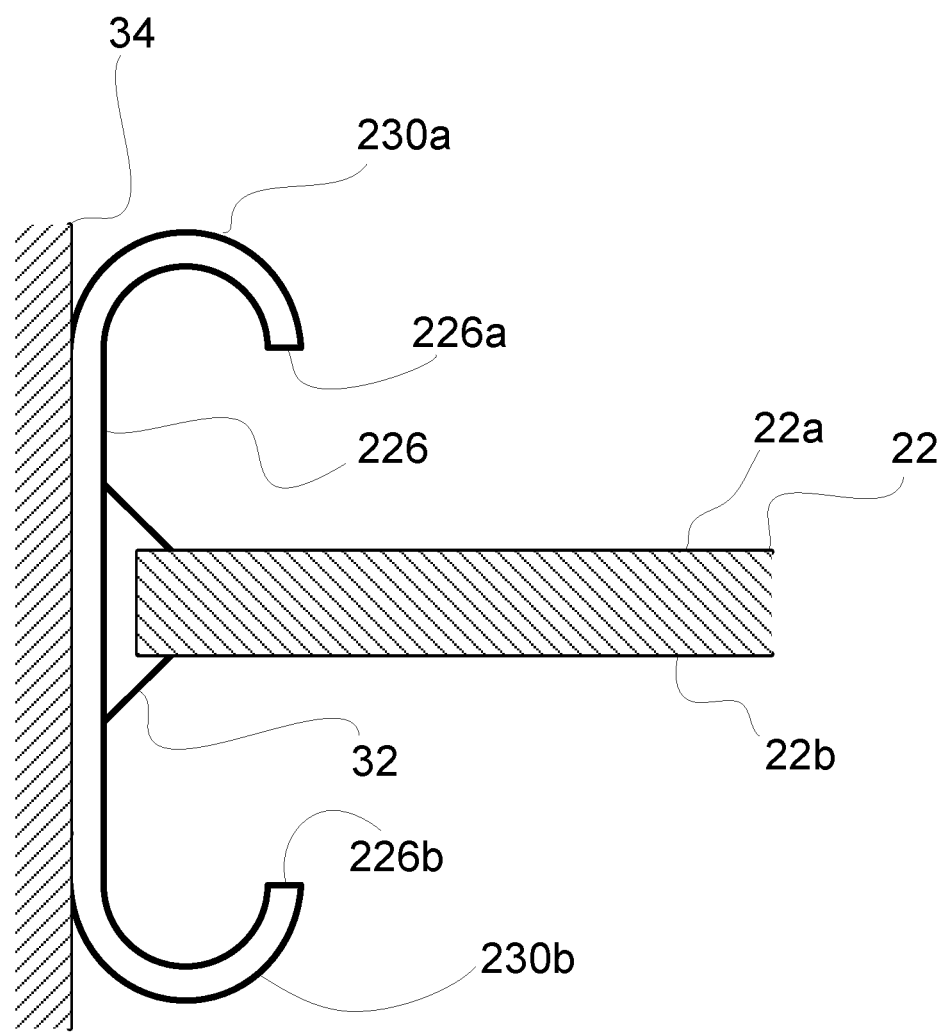
FIG. 5 shows a cross-sectional view of a third embodiment of a bulkhead assembly according to the invention.

A further embodiment of the invention is illustrated in FIG. 5, where a shaped pressure relief conduit 226 similar to that shown in the embodiment of FIG. 4 is arranged adjacent a bulkhead 22, and does not extend through the bulkhead 22. In this embodiment, the edge of the bulkhead 22 is received within a sealing flange 32. The sealing flange 32 extends about the periphery of the bulkhead 22, and is secured to the internal surface of the wall 34 of the shell of the wind turbine blade 10.

The pressure relief conduit 226 is arranged to extend through the sealing flange 32, such that the first and second open ends 226a,226b of the conduit 226 are located at first and second sides 22a,22b of the bulkhead 22 respectively.

Such a bulkhead assembly can be formed by providing a bore in the sealing flange 32, or by applying the sealing flange 32 around the conduit 226. In one aspect, the conduit 126 may be adhered to the internal surface of the blade wall 34 before installation of the sealing flange 32 and the bulkhead 22.

One of the advantages of this embodiment is that a bore does not have to be defined or formed in the body of the bulkhead 22. Accordingly, the structural integrity of the bulkhead 22 can be preserved.

In a further aspect of the invention not shown, the conduit 226 may be embedded in the blade wall 34, having first and second open ends 226a,226b defined in the blade wall 34 at either side of the bulkhead 22. For such a case, a channel may be defined in the blade wall 34 to receive the conduit 226. Alternatively, the conduit 226 may be formed within or incorporated into the blade wall 34 as part of the manufacturing process, e.g. the conduit 226 moulded into the blade wall 34 during a fibre lay-up process in a blade mould.

Figure 6:
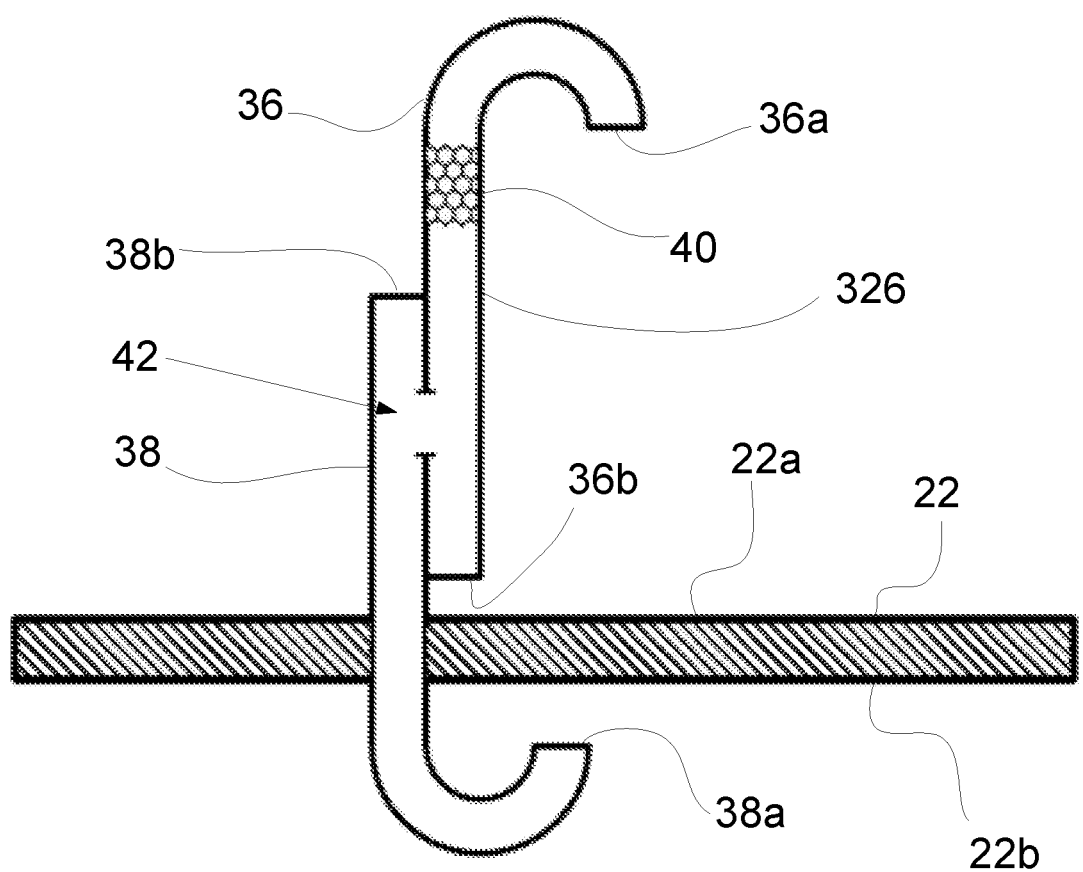
FIG. 6 shows a cross-sectional view of a fourth embodiment of a bulkhead assembly according to the invention.

A further embodiment of the invention is shown in FIG. 6, where the pressure relief conduit 326 is formed from a first tube 36 and a second tube 38 in fluid communication with each other. The first tube 36 comprises a first open end 36a and a second closed end 36b, and the second tube 38 comprises a first open end 38a and a second closed end 38b. The first and second tubes 36,38 are substantially J-shaped tubes, wherein a liquid trap is formed in each tube by the shaping of the tubes 36,38, the liquid traps located towards the first open ends 36a,38a of the respective tubes 36,38.

The tubes 36,38 are arranged such that the first open end 36a of the first tube 36 is located at the first side 22a of the bulkhead 22, and the second open end 38a of the second tube 38 is located at the second side 22b of the bulkhead 22. In the embodiment shown in FIG. 6, a filter medium 40 comprising a mesh or sponge is provided in the first tube 36, and the second tube 38 extends through the body of the bulkhead 22, but it will be understood that any suitable arrangement of the components of the bulkhead assembly may be used.

The first and second tubes 36,38 are positioned adjacent one another, and are communicatively coupled via an outlet channel 42 defined in the body of the tubes 36,38. The outlet channel 42 is located on the first and second tubes at a point between the first ends 36a,38a and second ends 36b,38b of the respective first and second tubes 36,38. By spacing the outlet channel from the closed ends of the tubes, further liquid traps are created between the first and second pressure relief tubes.

Figure 7:
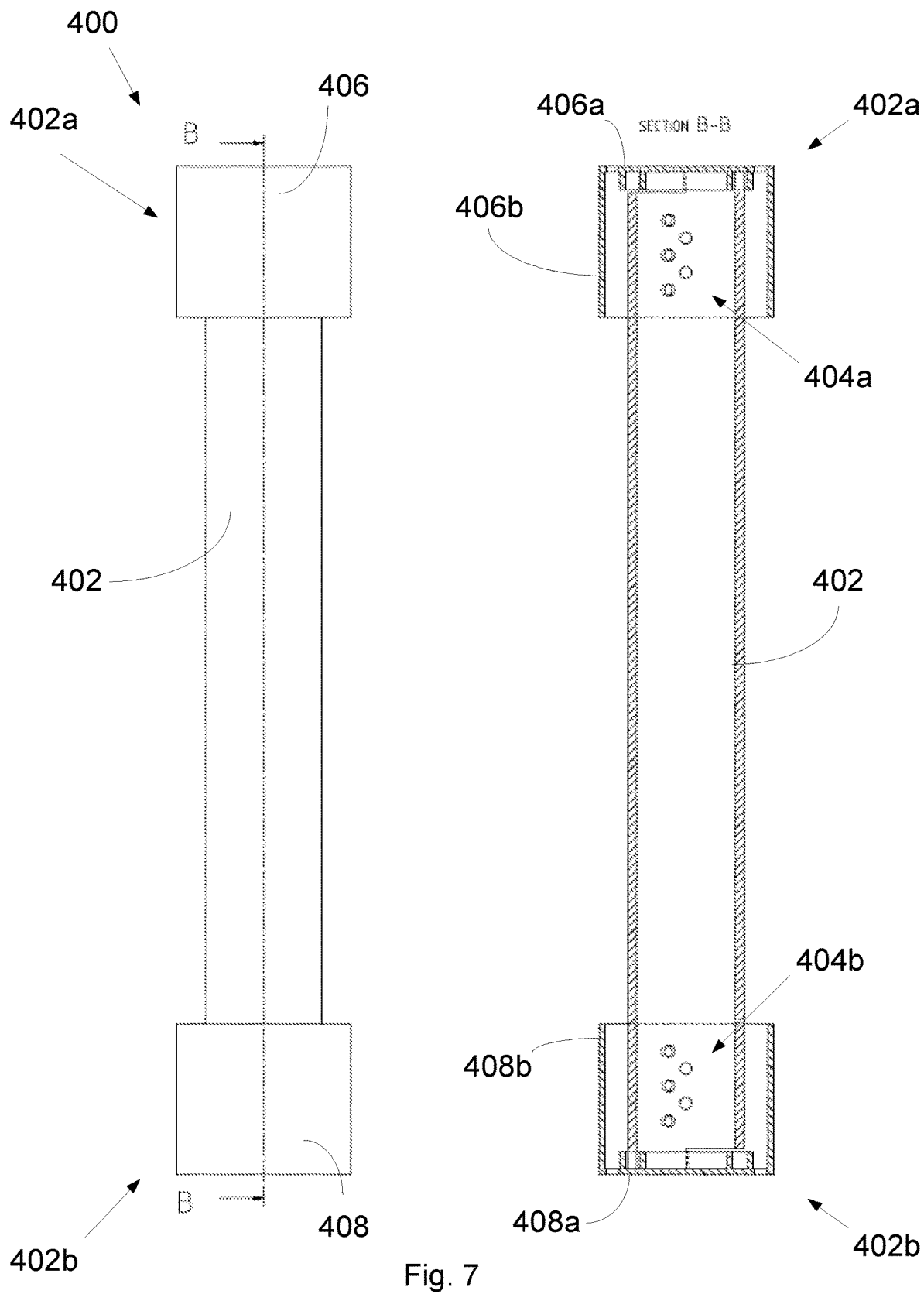
FIG. 7 shows a side plan view and a cross-sectional view of a pressure relief conduit assembly according to a further embodiment of the invention.

A further embodiment of a pressure relief conduit assembly 400 for use in a wind turbine blade is indicated in FIGS. 6 and 7.

The pressure relief conduit assembly 400 comprises an open-ended tube 402. A plurality of ventilation holes are defined in the wall of the tube 402. A first set of ventilation holes 404a are defined near a first end 402a of the tube 402, with a second set of ventilation holes 404b defined near an opposed second end 402b of the tube 402.

It will be understood the tube 402 may be positioned to extend through a wind turbine blade bulkhead, or may be positioned to the side of a bulkhead having said first and second ends 402a,402b arranged on either side of the bulkhead, similar to the constructions shown in the previous embodiments. The tube 402 acts to equalise pressure across the bulkhead in the blade, providing a pressure release channel between either side of the bulkhead.

The pressure relief conduit assembly 400 further comprises a pair of end caps 406,408, fitted to respective first and second ends 402a,402b of the tube 402. The end caps 406,408 comprise an end surface 406a,408a having respective collars 406b,408b depending therefrom.

The caps 406,408 are arranged such that the end surfaces 406a,408a substantially close the respective open ends 402a,402b of the tube 402. The collars 406b,408b extend from the respective ends 402a,402b of the tube 402, to a location along the longitudinal length of the tube 402 beyond the location of the respective first and second sets of ventilation holes 404a,404b. In this regard, the collars 406b,408b act as a cover or shield over the exposed ventilation holes 404a,404b defined in the external wall of the tube 402.

The collars 406b,408b are spaced from the external surface of the tube 402, such that a gap is preserved between the collars 406b,408b and the openings of the ventilation holes 404a,404b. Accordingly, the arrangement of the collars 406b,408b and the ventilation holes 404a,404b in the tube wall acts to impede ingress of dirt and debris into the interior of the tube 402.

In the embodiment of FIGS. 7 and 8, the first and second caps 406,408 are substantially identical. In a further embodiment, shown in FIGS. 9 and 10, the pressure relief conduit assembly 400 comprises a third cap design, indicated at 410.

In this embodiment, the second end cap 408 is replaced by a third end cap 410. The third cap 410 comprises an end section 410a arranged to substantially seal the second open end 402b of the tube 402, the third cap 410 further comprising a flared or umbrella-shaped collar 410b depending from said end section 410a. As with the embodiment of FIGS. 7 and 8, the flared collar 410b is arranged to extend along the length of the tube 402 from the second end 402b beyond the location of the second set of ventilation holes 404b.

Figure 10:
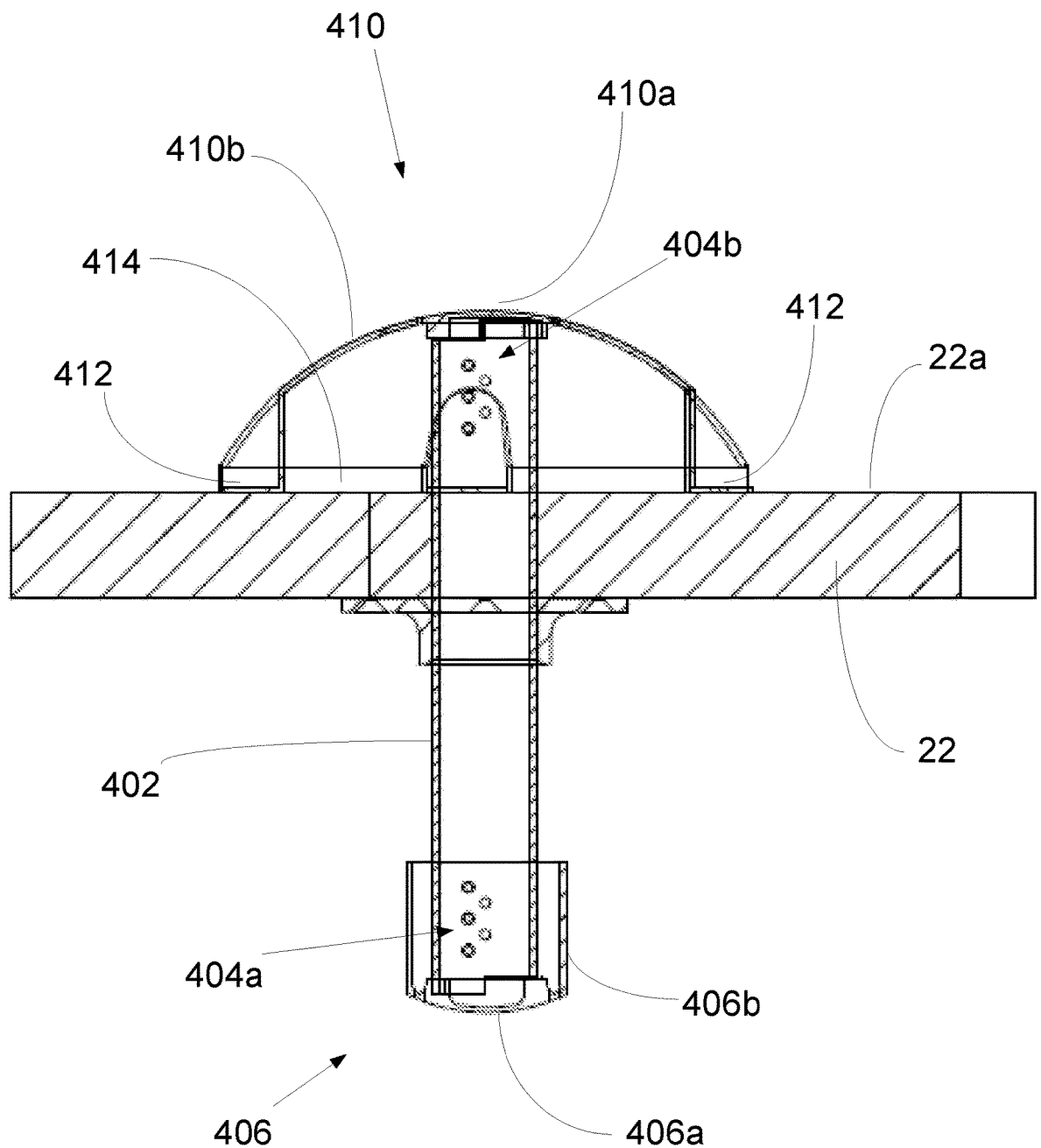
FIG. 10 shows an embodiment of a pressure relief conduit assembly in a winf turbine blade bulkhead according to an embodiment of the invention, incorporating the end cap of FIG. 9.

The third cap 410 further comprises at least one lug 412 to receive a bolt or other suitable securing device, the at least one lug 412 located at the free end of the flared collar 410b. With reference to FIG. 10, the at least one lug 412 can be used to secure the third cap 410 to the surface 22a of a blade bulkhead 22, using a fastening device such as a bolt or screw (not shown). Additionally or alternatively, it will be understood that the third cap 410 may be arranged to secure the pressure relief conduit assembly to a surface of a blade wall.

As can be seen in FIG. 9, the at least one lug 412 is arranged to project from the free end of the flared collar 410b, such that when the third cap 410 is secured to the surface of the bulkhead as shown in FIG. 10, a gap 414 is defined between the bulkhead surface 22a and the free end of the flared collar 410b. This embodiment allows for the pressure relief conduit assembly to be relatively easily secured to the general blade structure. While the third cap 410 shown in FIGS. 9 and 10 comprises four separate lugs 412, it will be understood that any number of and arrangement of lugs may be used. Additionally or alternatively, the third cap 410 may be secured to a bulkhead or to a blade wall using an adhesive or other suitable securing method.

It will be understood that the end caps 406,408,410 may be fitted to the ends of the tube 402 using any suitable method, e.g. a press fitting or snap fitting arrangement, or the use of a suitable attachment device such as a bolt, screw, staple, etc. or an adhesive. Furthermore, while the tube and end caps shown have a substantially circular cross-sectional profile, it will be understood that the elements of the pressure relief conduit may have other cross-sectional shapes, e.g. square, rectangular, etc.

Such a construction of a pressure relief conduit allows for relatively easy manufacture and assembly of the conduit for use in a wind turbine blade.

The invention provides a pressure relief conduit for a wind turbine blade bulkhead assembly, having conduit openings at either side of the bulkhead, such that the pressure difference can be equalised across the bulkhead, preventing faults or cracks in the bulkhead assembly due to pressure differences. Liquid traps and/or filter media can be accommodated in the conduit to prevent the passage of liquids or other matter across the bulkhead.

The invention is not limited to the embodiment described herein, and may be modified or adapted without departing from the scope of the present invention.

The invention claimed is:

1. A wind turbine blade comprising:
    a sealed bulkhead provided in said wind turbine blade; and
    at least one pressure relief conduit having a first open end located at a first side of said bulkhead and a second open end located at a second side of said bulkhead, wherein said at least one pressure relief conduit comprises at least one liquid trap, and
    wherein said pressure relief conduit is operable to equalize the pressure difference between said first side and said second side of said bulkhead.

2. The wind turbine blade of claim 1, wherein said at least one pressure relief conduit comprises a bore defined in the body of said bulkhead, said bore extending from the first side of said bulkhead to the second side of said bulkhead.

3. The wind turbine blade of claim 1, wherein the at least one pressure relief conduit comprises a tube or pipe extending through the body of said bulkhead.

4. The wind turbine blade of claim 1, wherein said at least one pressure relief conduit is arranged adjacent said bulkhead.

5. The wind turbine blade of claim 4, wherein said at least one pressure relief conduit is provided between said bulkhead and the blade body or outer blade shell of said wind turbine blade.

6. The wind turbine blade of claim 4, wherein said bulkhead is secured to the blade body via a sealing flange provided about the periphery of said bulkhead, said sealing flange located between said bulkhead and said blade body, wherein said at least one pressure relief conduit extends through said sealing flange, adjacent to said bulkhead.

7. The wind turbine blade of claim 6, wherein the sealing flange comprises at least one flexible member arranged around the periphery of the bulkhead.

8. The wind turbine blade of claim 1, wherein said at least one liquid trap comprises at least one of a U-bend, a J-bend, or an S-bend trap.

9. The wind turbine blade of claim 1, wherein said at least one liquid trap comprises a filter material located within said conduit.

10. The wind turbine blade of claim 1, wherein the at least one pressure relief conduit is formed from a flexible tube.

11. The wind turbine blade of claim 1, wherein said at least one pressure relief conduit is formed from a first pressure release tube having a first open end and a second closed end, and a second pressure release tube having a first open end and a second end, wherein the first open end of said pressure relief conduit is formed by the first open end of said first pressure release tube, wherein the second open end of said pressure relief conduit is formed by the first open end of said second pressure release tube, and wherein said first and second pressure relief tubes are communicatively coupled via an outlet channel extending between said first and second pressure relief tubes, wherein said outlet channel is arranged on said first pressure relief tube at a point between the first and second ends of said first pressure relief tube.

12. The wind turbine blade of claim 11, wherein said second pressure release tube comprises a second closed end opposed to said first open end, wherein said outlet channel is arranged on said second pressure relief tube at a point between the first and second ends of said second pressure relief tube.

13. The wind turbine blade of claim 1, wherein the wind turbine blade comprises a pressure relief conduit assembly, wherein the blade comprises at least one end cap provided at one of said first or second open ends of said at least one pressure relief conduit, said at least one end cap arranged to seal said conduit at said first or second open end, and wherein the at least one pressure relief conduit is distinct from a sealable access opening providing passage through the sealed bulkhead.

14. The wind turbine blade of claim 13, wherein at least one ventilation hole is defined in a wall of said pressure relief conduit.

15. The wind turbine blade of claim 14, wherein said at least one cap comprises an end piece to seal an open end of said conduit, said at least one end cap further comprising a collar depending from said end piece, said collar spaced from the wall of said pressure relief conduit, and acting to shield at least a portion of said at least one ventilation hole.

16. The wind turbine blade of claim 15, wherein said collar extends from a location adjacent an end of said pressure relief conduit to a location along the longitudinal length of said pressure relief conduit beyond the location of said at least one ventilation hole on said pressure relief conduit.

17. The wind turbine blade of claim 15, wherein said collar extends in a direction parallel to the wall of said pressure relief conduit.

18. The wind turbine blade of claim 15, wherein said collar extends in a direction flared away from the wall of said pressure relief conduit.

19. The wind turbine blade of claim 15, wherein said at least one end cap is arranged such that a gap is defined between an end of said collar and the attached bulkhead or internal wall of the wind turbine blade.

20. The wind turbine blade of claim 14, wherein said at least one ventilation hole is provided adjacent said at least one end cap.

21. The wind turbine blade of claim 13, wherein said at least one end cap is arranged to be attached to said bulkhead or to an internal wall of said wind turbine blade.

22. The wind turbine blade of claim 21, wherein said at least one end cap comprises at least one bolt lug.

23. The wind turbine blade of claim 13, wherein a first set of ventilation holes are defined in a wall of said pressure relief conduit at a location adjacent said first open end, and wherein a second set of ventilation holes are defined in a wall of said pressure relief conduit at a location adjacent said second open end.

24. The wind turbine blade of claim 23, wherein the wind turbine blade comprises a first end cap provided at said first open end of said pressure relief conduit and a second end cap provided at said second open end of said pressure relief conduit, wherein said first end cap acts to shield at least a portion of said first set of ventilation holes and wherein said second end cap acts to shield at least a portion of said second set of ventilation holes.

25. A wind turbine comprising at least one wind turbine blade as claimed in claim 1.

26. A wind turbine blade comprising:
a sealed bulkhead provided in said wind turbine blade; and
at least one pressure relief conduit having a first open end located at a first side of said bulkhead and a second open end located at a second side of said bulkhead,
wherein said pressure relief conduit is operable to equalize the pressure difference between said first side and said second side of said bulkhead,
wherein said at least one pressure relief conduit is formed from a first pressure release tube having a first open end and a second closed end, and a second pressure release tube having a first open end and a second end,
wherein the first open end of said pressure relief conduit is formed by the first open end of said first pressure release tube,
wherein the second open end of said pressure relief conduit is formed by the first open end of said second pressure release tube,
wherein said first and second pressure relief tubes are communicatively coupled via an outlet channel extending between said first and second pressure relief tubes, and
wherein said outlet channel is arranged on said first pressure relief tube at a point between the first and second ends of said first pressure relief tube.

27. A wind turbine blade comprising:
a sealed bulkhead provided in said wind turbine blade;
at least one pressure relief conduit having a first open end located at a first side of said bulkhead and a second open end located at a second side of said bulkhead, wherein said pressure relief conduit is operable to equalize the pressure difference between said first side and said second side of said bulkhead;
a pressure relief conduit assembly; and
at least one end cap provided at one of said first or second open ends of said at least one pressure relief conduit, said at least one end cap arranged to seal said at least one pressure relief conduit at said first or second open end, and wherein the at least one pressure relief conduit is distinct from a sealable access opening providing passage through the sealed bulkhead.

* * * * *